Jan. 13, 1931.  J. A. ROGERS  1,789,256
UNNAILING MACHINE
Filed Jan. 25, 1928  2 Sheets-Sheet 1
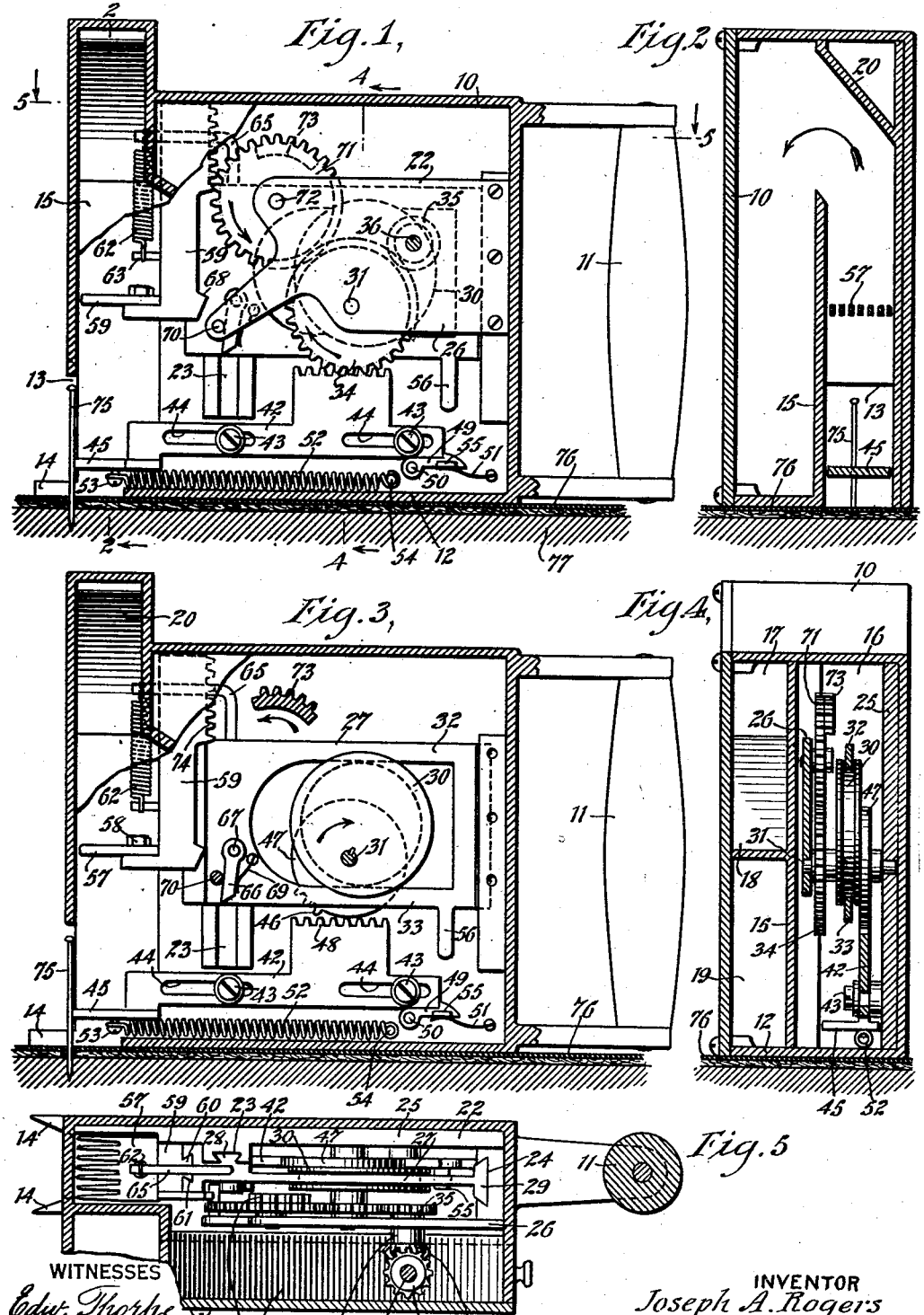
WITNESSES
Edw. Thorpe
Chris Feinle
INVENTOR
Joseph A. Rogers
BY
ATTORNEY Jan. 13, 1931.  J. A. ROGERS  1,789,256
UNNAILING MACHINE
Filed Jan. 25, 1928  2 Sheets-Sheet 2

WITNESSES
Edw. Thorpe
Chris Genle

INVENTOR
Joseph A. Rogers
BY
Munn & Co.
ATTORNEY

Patented Jan. 13, 1931

1,789,256

UNITED STATES PATENT OFFICE

JOSEPH A. ROGERS, OF NEW YORK, N. Y.

UNNAILING MACHINE

Application filed January 25, 1928. Serial No. 249,419.

This invention relates to a machine for pulling or removing projecting nails.

Some of the objects of the present invention are: to provide a machine which is adapted to traverse a row of projecting nails, used for attaching anything, and for expeditiously pulling or removing the nails one after the other; to provide a machine of the indicated character which will be portable by hand and whose operating parts may be motor operated; and to provide a machine of the indicated character which will embody novel features of construction and operation and which will be sturdy and comparatively inexpensive.

The nature of the invention and its distinguishing features and advantages will appear when the following specification is read in connection with the accompanying drawing, in which—

Figure 1 is a longitudinal sectional elevation of the machine embodying the features of the present invention, showing the disposition of the parts just after the removal of a nail, and prior to the engagement of another nail.

Fig. 2 is a transverse sectional view taken on the line 2—2, of Fig. 1.

Fig. 3 is a view similar to Fig. 1, with certain parts removed to more clearly illustrate certain features of the machine.

Fig. 4 is a transverse sectional view taken on the line 4—4 of Fig. 1.

Fig. 5 is a horizontal sectional view taken on the line 5—5, of Fig. 1.

Figure 6:
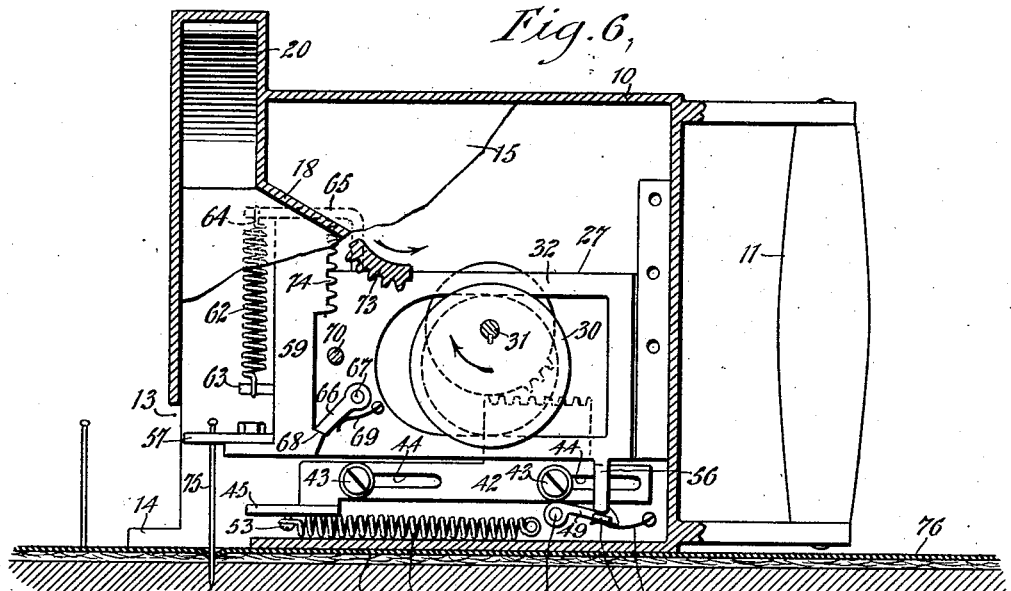
Fig. 6 is a view similar to Fig. 1, but showing a transposition of the parts just prior to the initial nail pulling operation.

Referring now more particularly to the views of the drawing it will be apparent that the machine includes a casing 10 having a handle 11 at one end, a bottom or base plate 12 which moves in contact with the material which is nailed, an opening 13 at the lower front end, and spaced points 14. The casing 10 is divided longitudinally by a partition 15 to provide a compartment 16, and a compartment 17, the latter being subdivided by an angular wall 18 which presents a receptacle 19 for the removed fasteners or nails. The nails in the removing operation are deflected into the receptacle 19 by a wall 20 arranged at an angle and serving as a deflector. The rear end of the receptacle 19 has a closure member or door 21 which may be opened for the purpose of discharging the nails within the receptacle 19. Arranged within the compartment 16 is a frame 22, and this frame is fixedly secured in any suitable manner to one of the side walls of the casing 10. The frame 22 includes vertically disposed dovetail grooves 23 and 24, and side plates 25 and 26. A frame 27 is arranged for up and down movement with respect to the fixed frame 22 and this is accomplished by the provision of dovetail members 28 and 29 respectively disposed in the grooves 23 and 24. The frame 27 will therefore be mounted for slidable up and down movement with respect to the frame 22.

In order to effect the up and down movement of the frame 27 there is provided a grooved cam 30 keyed to a shaft 31 whose opposite ends are respectively journaled in bearings respectively in the plates 25 and 26. The cam 30 is secured to the shaft 31 eccentrically with respect to the axis of said shaft. The cam 30 moves in contact with the upper and lower horizontally disposed portions 32 and 33 of the frame 27. The shaft 31 also has keyed thereto a gear 34 which meshes with a pinion 35 keyed to a stub shaft 36 mounted for rotation in a bearing 37 carried by the plate 26. The stub shaft 36 has keyed thereto a bevel gear 38 which meshes with a bevel gear 39 keyed to a shaft element 40 mounted for rotation in bearings 41 on the partition 15. The shaft element 40 is adapted for connection with a known type of flexible shaft connected with a suitable source of power such as an electric motor.

Nail encountering means is positioned at the bottom of the casing 10 to encounter one of the projecting nails to prevent the advancement of the machine further than a point at which the nail engaging means to be hereinafter described, will be in position to engage the encountered nail. The said nail encountering means includes a member 42 mounted for reciprocation on studs 43 carried by the frame 22 and disposed respectively in slots 44 in the member 42. The member 42 has an abutment 45 at the forward end which encounters each nail as shown in Figs. 1 and 3, when the member 42 is in its forward position. The member 42 is moved to its forward nail encountering position by means of a sector of teeth 46 on a disk 47 keyed to the shaft 31, and teeth 48 on the member 42 with which the teeth 46 are adapted to engage in the rotation of the disk 47 in a clockwise direction. The member 42 is held in its forward position by a latch 49 pivoted as at 50 to the plate 25. The latch 49 is acted on by a spring 51 also carried by the plate 25. The spring 51 has a normal tendency to move the latch 49 to a point to engage the rear end of the member 42 to hold the member 42 against rearward movement. The member 42 is moved rearwardly by means of a coil spring 52 which has one end thereof connected with the abutment 45 as at 53, and the opposite end thereof is connected with the side plate 25, as at 54. The latch 49 has a lug 55 which is encountered by a lug 56 on the frame 27 in the downward movement of the frame 27 to cause the disengagement of the latch 49 with the member 42, to permit the spring 52 to function to effect the rearward movement of the member 42 to the position shown in Figs. 6 and 7. The member 42 is limited in its rearward movement by the studs 43 which respectively engage end walls of their related slots 44.

Figure 7:
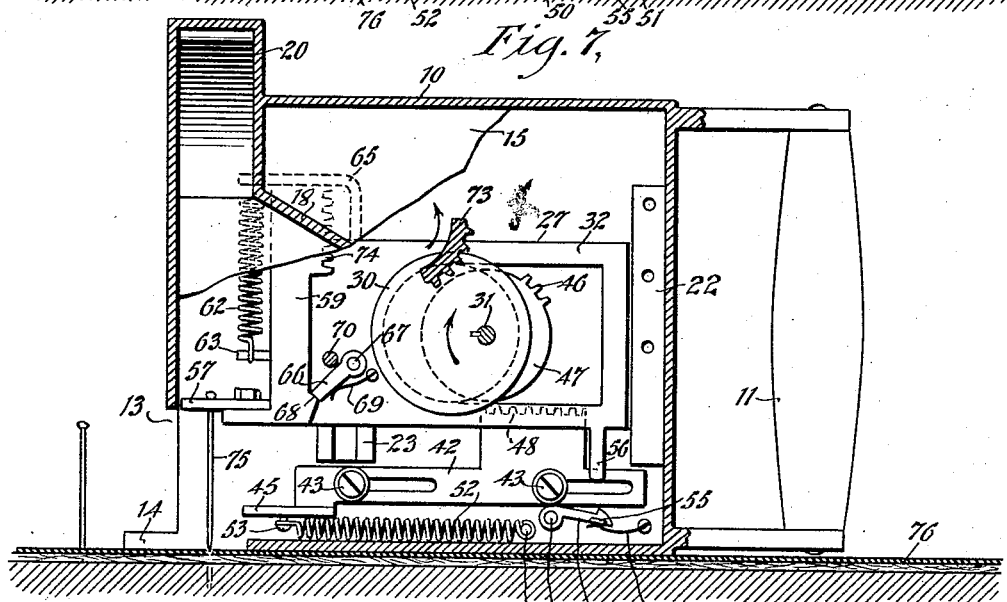
Fig. 7 is a view similar to Fig. 6, but showing a transposition of the parts just prior to the nail jerking operation.
Figure 8:
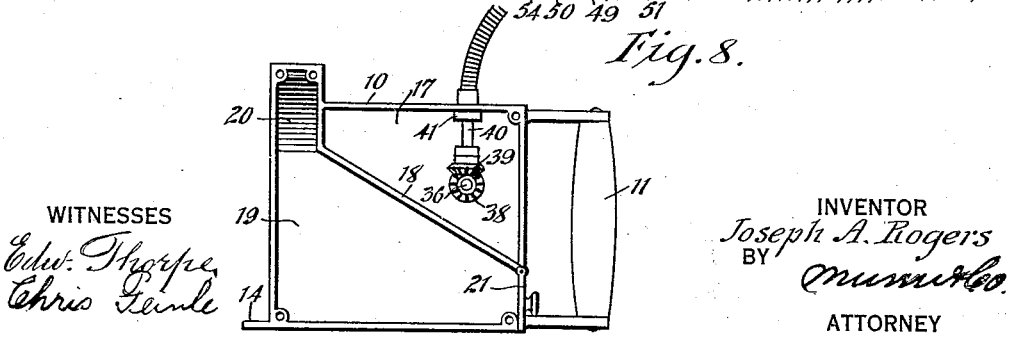
Fig. 8 is a view of the machine with one of the side plates removed showing the drive connection.

Means is provided for engaging each of the nails and is adapted to engage under the head of each nail. In the present instance the nail engaging means consists of a claw member 57 detachably connected as at 58 with a block 59. The block 59 has a dovetail rib 60 which is movable in a corresponding dovetail groove 61 in a vertical portion of the movable frame 27. The block 59, and therefore the claw member 57 is under the influence of a coil spring 62 which has one end thereof connected as at 63 with the block 59, and the opposite end thereof is connected as at 64 with a member 65 carried by the movable frame 27. It will therefore be apparent that the nail engaging means will be movable relatively to the movable frame 27 under the action of the spring 62. In order to cause the nail engaging means to move with the movable frame 27 there is provided a latch 66 which is pivotally mounted as at 67 to the frame 27, and its opposite end is engageable with a projection 68 on the block 59. A spring 69 carried by the frame 27 acts on the latch 66 and has a normal tendency to urge the latch 66 to a position to engage the projection 68, as shown in Fig. 6. It will now be apparent that when the frame 27 is moved upwardly the block 59 and therefore the claw member 57 will also move upwardly, the frame 27 being under the positive action of the cam 30, while the block 59 and claw member 57 are under the action of the spring 62 which has been placed under tension. As the frame 27 continues to move upwardly, the latch 66 engages a pin 70 carried by the plate 26, causing the latch to move out of engagement with the projection 68. This is followed immediately by an upward jerk on the head of the nail to complete the removing operation. The removed nail will be projected upwardly against the wall 20 and be deflected thereby into the receptacle 19.

In order to effect the downward movement of the nail engaging means, and to place the spring 62 under tension there is provided a gear 71 mounted for rotation on a stub shaft 72 carried by the plate 26. The said gear 71 meshes with the gear 34, consequently the gear 71 rotates in a counter clockwise direction. The gear 71 carries a toothed sector 73, the teeth of which are adapted to mesh with teeth 74 on the block 59. It will now be understood that the frame 27 will be caused to move downward by the cam 30, and that the nail engaging means consisting of the claw member 57 and block 59 will be moved downwardly by the sector 73, and that there will come a time when the latch 66 re-engages the projection 68 on the block 59 to hold the block and claw member 57 in position with the spring 62 under tension. The claw member 57 will be moved to its normal position shown in Fig. 6, but before it arrives at its normal position, the lug 56 will have encountered the lug 55 on the latch 49 to release the nail encountering means, or in other words, will allow the member 42 and therefore the abutment 45 to be moved rearwardly by the action of the spring 52 to a normal position.

One of the uses of the machine is to remove the nails serving for attaching a piece of fur in stretched condition on a table, the nails, which project, are designated 75, the fur is designated 76, and the table top is designated 77 in which the nails are driven along the marginal edge of the fur 76 in rows. The operation of the machine is as follows. With the parts of the machine transposed as they are in Fig. 1, considering that a nail has just been removed, the nail encountering means will have been operated to bring the abutment 45 to a position to encounter one of the nails 75 to prevent the advancement of the machine further than a point at which the claw member 57 will be in position to engage the encountered nail. The machine will be in constant operation, consequently the gear 34 will be rotating in a clockwise direction. There cames a time when the sector 73 engages the teeth 74, causing the block 59 and therefore the claw member 57 to move downwardly, simultaneously with the downward movement of the movable frame 27 which is caused by the cam 30 acting on the portion 33 of the frame 27. It will also be understood that the spring 62 will be placed under tension. The block 59 will move downwardly, relatively to the frame 27, to a position in which the latch 66 will engage the projection 68. This is possible due to the fact that in the downward movement of the frame 27, the latch 66 will have cleared the pin 70 on the stationary plate 26 of the frame 22. Before the claw member 57 reaches its down or nail engaging position, the lug 56 will have encountered the lug 55 on the latch 49 to disengage it from the member 42 to allow the spring to move the member 42 and therefore the abutment 45 to the retracted normal position. This is followed immediately by the claw member 57 reaching its down position shown in Fig. 6. As the cam 30 continues to operate, the frame 27 will be caused to move upwardly, since the cam will be acting on the portion 32 of the frame 27. The claw member 57 will also be moving upwardly engaged under the head of the nail, and will exert a pulling force on the nail. As the frame 27 continues to move upwardly, there comes a time when the latch 66 encounters the pin 70, and the latter causes the latch 66 to move on its pivot out of engagement with the projection 68 on the block 59. Immediately the spring 62 which is still under tension exerts a quick jerk on the block 59 and therefore the claw member 57, and as a consequence the nail will be thrown upwardly to be deflected by the wall 20 into the receptacle 19, to complete the nail removing operation. The operation just described is repeated until all the nails have been removed, which is accomplished by merely manually advancing the machine so as to traverse the rows of projecting nails.

It is to be understood that the invention is not restricted to the precise arrangement of parts shown and described, as details of construction may be modified and rearranged without departing from the spirit of the invention, the scope of which is limited only by the terms of the appended claims.

I claim:

1. A portable machine for removing projecting nails comprising the combination of nail engaging means positioned to engage a nail in the forward movement of the machine, mechanism for exerting first a pulling force on said nail engaging means and then a quick jerk thereon while said nail engaging means is engaged with a nail, to cause said means to remove the nail, nail encountering means movable into position to encounter another nail to prevent the advancement of the machine until the nail engaging means has approximately returned to its engaging position, and means for effecting the movement of the nail encountering means into and out of the encountering position.

2. A portable machine for removing projecting nails comprising the combination of a claw member adapted to be engaged under the head of a nail, means mounting the claw member for up and down movement, power means connected with the claw member and operable to cause an initial comparatively slow upward movement of the claw member followed by a quick upward jerk on the claw member to cause the latter to remove the nail, said power means also being operable to move the claw member to a position to be engaged under the head of another nail for a repetition of the nail removing operation.

3. A machine for removing projecting nails comprising a fixed frame, a frame movable up and down on the fixed frame, a claw member adapted to be engaged under the head of a nail, means on the movable frame mounting the claw member for up and down movement relative thereto, recoil means connected between the movable frame and the claw member, a latch on said movable frame acting on the claw member to hold it in a position with the recoil means under a determinate tension, power and motion transmission mechanism for effecting the upward movement of the movable frame to cause the upward movement of the claw member to cause the latter to exert a pull on the nail, means for releasing the latch upon the upward movement of the movable frame to allow the recoil means to quickly jerk the claw member upwardly to jerk the nail upwardly; said power and motion transmission mechanism also operating to move the movable frame and the claw member to their down positions, said latch being automatically re-engageable with the claw member in the relative downward movement of the claw member to again hold the claw member against upward movement with respect to the movable frame.

4. A machine for removing nails comprising the combination of a portable structure, a frame mounted for guided up and down movement on said structure, a movable claw on said frame, a recoil spring connected with the claw and frame, a latch on said frame, yieldable means acting on said latch to engage it with the claw to hold the claw in a position with respect to the frame to keep the recoil spring under tension, a shaft carried by said structure and extending transversely to the frame, a cam fixed to the shaft to effect the up and down movement of the frame in response to the turning movement of the shaft, a gear fixed on the shaft to cause the shaft to turn, means to operate the gear, the up movement of the frame causing a similar movement of the claw through the intervention of the latch, means for releasing the latch by the up movement of the frame to allow the recoil spring to quickly jerk the claw upwardly, and means operated by the gear to move the claw to a position to engage a nail or like element by the forward movement of said portable structure.

5. A machine portable along a row of projecting nails, comprising the combination of nail removing mechanism including nail engaging means; nail encountering means movable into and out of nail encountering position, and means for moving said nail encountering means into and out of the nail encountering position, the encountering means in the nail encountering position serving to encounter one of the projecting nails to momentarily prevent the advancement of the machine further than a point at which the nail engaging means will be engageable with the encountered nail by the advancement of the machine, said nail engaging means being engageable with the nail when the encountering means is out of its encountering position.

6. A machine portable along a row of projecting nails, comprising the combination of nail removing mechanism including nail engaging means; nail encountering means movable into and out of nail encountering position, and means operated by the nail removing mechanism for moving said nail encountering means into and out of the nail encountering position, the encountering means in the nail encountering position serving to encounter one of the projecting nails to momentarily prevent the advancement of the machine further than a point at which the nail engaging means will be engageable with the encountered nail by the advancement of the machine, said nail engaging means being engageable with the nail when the encountering means is out of its encountering position.

7. A machine portable along a row of projecting nails, comprising the combination of a housing, nail removing mechanism including nail engaging means operatively arranged in said housing; a nail encountering member mounted for guided movement into and out of nail encountering position in said housing, means operated by the nail removing mechanism while the latter is removing a nail, to move the encountering member into the encountering position to encounter another one of the nails, for the purpose of preventing the advancement of the machine beyond a position in which the nail engaging means will be engageable with the encountered nail, latch means carried by said housing automatically engageable with the encountering member to hold it in the encountering position, means operable to move the encountering member out of the encountering position when the latch means is disengaged from the encountering member, and means operated by the nail removing mechanism to disengage the latch means during the operation of said mechanism to bring the nail engaging means into a position to engage the encountered nail.

Signed at New York, in the county of New York and State of New York, this 23rd day of January, A. D. 1928.

JOSEPH A. ROGERS.